United States Patent [19]

Foote et al.

[11] Patent Number: 4,834,569
[45] Date of Patent: May 30, 1989

[54] THERMAL EXPANSION COMPENSATING JOINT ASSEMBLY

[75] Inventors: Eugene B. Foote; Daniel N. Giles, both of Seattle, Wash.

[73] Assignee: The Boeing Company, Seattle, Wash.

[21] Appl. No.: 49,307

[22] Filed: May 13, 1987

[51] Int. Cl.⁴ ............................................. F16B 5/00
[52] U.S. Cl. ......................................... 403/2; 403/30; 403/179; 403/404; 403/408.1
[58] Field of Search ............... 403/30, 29, 28, 2, 179, 403/404, 408.1, 388

[56] References Cited

U.S. PATENT DOCUMENTS

| | | |
|---|---|---|
| 2,662,725 | 12/1953 | McVeigh. |
| 3,643,290 | 2/1972 | Milne. |
| 3,690,705 | 9/1972 | Ygfors. |
| 4,052,826 | 10/1977 | Chisholm ........................ 403/2 X |
| 4,156,299 | 5/1979 | Kovac. |
| 4,232,496 | 11/1980 | Warkentin. |
| 4,312,599 | 1/1982 | Darolia ............................ 403/29 |
| 4,485,545 | 12/1984 | Caverly. |
| 4,540,304 | 9/1985 | Pavelka et al. |
| 4,575,047 | 3/1986 | Doos et al. ..................... 403/404 X |

FOREIGN PATENT DOCUMENTS

| | | | |
|---|---|---|---|
| 0107120 | 8/1980 | Japan .............................. 403/28 |
| 2045377 | 10/1980 | United Kingdom ............ 403/388 |

*Primary Examiner*—Andrew V. Kundrat
*Assistant Examiner*—Peter M. Cuomo
*Attorney, Agent, or Firm*—Finnegan, Henderson, Farabow, Garrett & Dunner

[57] ABSTRACT

A thermal stress-free joint assembly for joining a low thermal expansion member and a high thermal expansion member uses a fastener and a bushing fitted within a bore in the low thermal expansion member, wherein the fastener and bushing materials are selected to have predetermined coefficients of thermal expansion. The fastener includes a shank which passes through the bore in the low thermal expansion member. The bushing, bore and shank are dimensioned according to a mathematical relationship to maintain a predetermined clearance or preload as the joint undergoes changes in temperature, without damage to either joined member from thermally induced stress.

10 Claims, 1 Drawing Sheet

THERMAL EXPANSION COMPENSATING JOINT ASSEMBLY

BACKGROUND OF THE INVENTION

1. Field of the Invention

This invention relates to bolted joints, for use in low thermal expansion materials, and more particularly to a joint assembly wherein a metallic fastener joins material having a low coefficient of thermal expansion to a material having a high coefficient of thermal expansion.

2. Description of the Related Art

With the increasing use of ceramic and other low thermal expansion materials, a problem is encountered when such materials are joined to high thermal expansion materials. Such materials also are typically used in high strength conventional fasteners, such as metallic bolts. Metal fasteners are thermally incompatible with ceramic and other low thermal expansion materials in that the metal expands more than the ceramic material does with an increase in temperature. The coefficient of thermal expansion for metals ranges from $3 \times 10^{-6}$ to $13 \times 10^{-6}$ in./in./°F., with the coefficient of thermal expansion for steel being about $10 \times 10^{-6}$ in./in./°F. On the other hand, ceramic materials have a coefficient of thermal expansion of $1 \times 10^{-6}$ to $2 \times 10^{-6}$ in./in./°F. If a metallic bolt shank is fitted closely within a bore in a ceramic material, cracking of the ceramic material is likely to occur if the joint is exposed to temperature changes.

Various bushings are conventionally used for providing a close fit between a shank and a bore through which the shank passes. Two such bushings are disclosed in U.S. Pat. Nos. 4,156,299 and 3,643,290. However, these devices do not address the problem of differential thermal expansions. Other attempts have been made for joining ceramic and metal parts in a manner that compensates for differential thermal expansions. However such joints have proved complex and costly and they do not eliminate thermally induced stress in the materials being joined.

The problem of fitting a high thermal expansion fastener in the bore of a low thermal expansion material and the problem of compensating for differential expansions between the high and low thermal expansion materials being joined so that thermal stress does not result upon temperature change has not been addressed. The present invention provides a cost efficient solution to this problem.

SUMMARY OF THE INVENTION

Accordingly, it is an object of the invention to provide a thermal stress-free joint assembly for joining a high thermal expansion material to a low thermal expansion material by means of a high thermal expansion shank within a bore in the low thermal expansion material.

It is another object of the present invention to provide a joint assembly in which a high thermal expansion shank fits closely within a bore in a low thermal expansion material and remains closely fit with temperature changes.

It is additionally an object of the invention to provide a joint assembly that does not experience thermally induced stress with temperature change and that can be produced at a cost that is comparable to the cost of conventional bolted joint assemblies.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

To achieve the objects and in accordance with the purpose of the invention, as embodied and as broadly described herein, a thermal stress-free joint assembly for joining a high thermal expansion material and a low thermal expansion material is provided, comprising: a first member having a bore therethrough, the first member comprised of a first material having a first coefficient of thermal expansion, the bore having a selected cross section; a second member; a fastener comprised of a second material having a second coefficient of thermal expansion, the second coefficient of thermal expansion being greater than the first coefficient of thermal expansion, the fastener including a shank having a selected cross section passing through the bore, the fastener engaging said second member for joining said first and second members; an annular bushing disposed in the bore and having a selected external diameter and a circumferential surface closely engaging the periphery of the bore, an internal circumferential surface closely engaging the shank and at least one frangible portion extending between the external and internal circumferential surfaces, the bushing being comprised of a material having a third coefficient of thermal expansion that is less than the first and second coefficients of thermal expansion, the shank and bore dimensions being selected in accordance with the following equation:

$$D_1/D_2 = (\alpha_3 - \alpha_1)/(\alpha_3 - \alpha_2)$$

where
- $D_1$ = shank cross sectional dimension
- $D_2$ = bore dimension
- $\alpha_1$ = first member coefficient of thermal expansion
- $\alpha_2$ = shank coefficient of thermal expansion.
- $\alpha_3$ = bushing coefficient of thermal expansion The accompanying drawings, which are incorporated in and constitute a part of this specification, illustrate the presently preferred embodiment of the invention and, together with the description, serve to explain the principles of the invention.

DESCRIPTION OF THE PREFERRED EMBODIMENT

Figure 1:
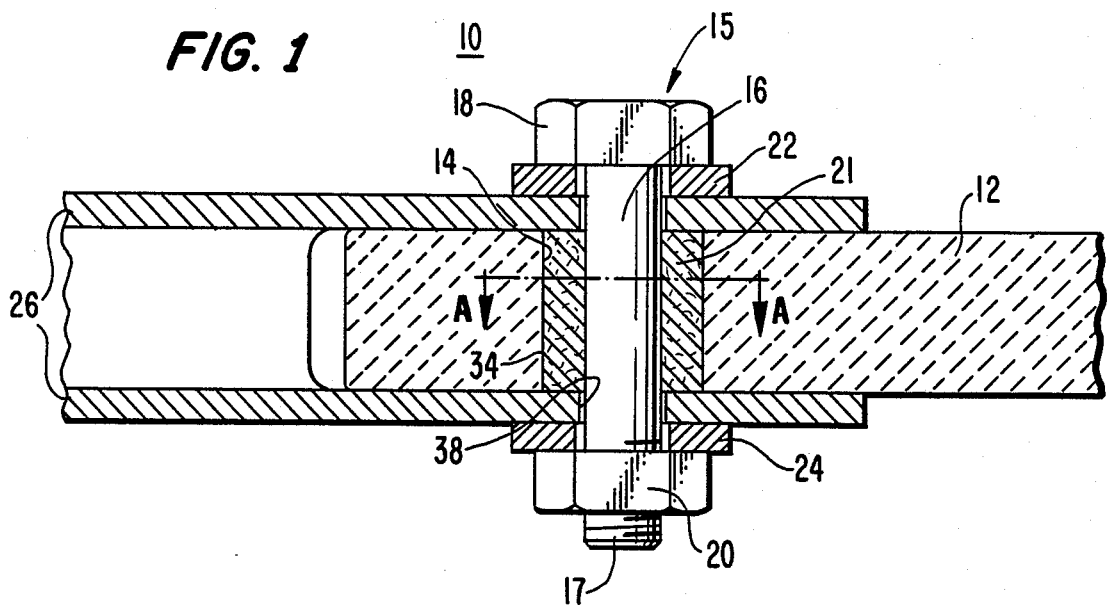
FIG. 1 is a cross-sectional view of a joint assembly according to the preferred embodiment of the invention.

Reference will now be made in detail to a presently preferred embodiment of the invention, an example of which is illustrated in the accompanying drawings. Throughout the drawings, like reference characters are used to designate like elements.

Figure 2:
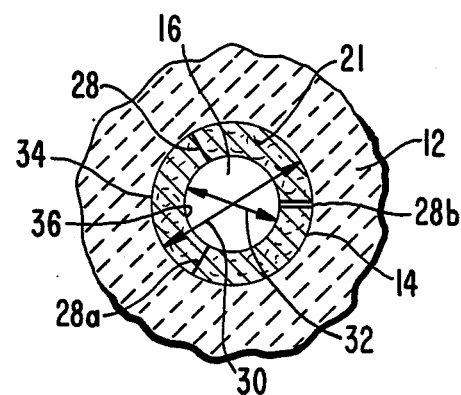
FIG. 2 is a cross-sectional view of the joint assembly shown in FIG. 1 taken along the line A—A.

According to the present invention, there is provided a joint assembly 10 which includes a first member 12 having a bore therethrough and a second member 26 having an aperture 38. The first member is comprised of a first material having a first coefficient of thermal expansion $\alpha_1$, and the bore has a selected cross sectional dimension. As embodied herein, a first member 12 is comprised of a material having a low coefficient of thermal expansion, as for example, a ceramic material with a coefficient of thermal expansion in the range of about $1\times10^{-6}$ to about $2\times10^{-6}$ in./in./°F. Second member 26 may also be comprised of a metallic material. Member 12 has a bore 14 formed therethrough. Preferably, bore 14 is a circular cylindrical bore having a diameter shown by dimension line 30 in FIG. 2.

According to the present invention, a fastener 15 is provided which is comprised of a second material having a second coefficient of thermal expansion $\alpha_2$, the second coefficient of thermal expansion being greater than the first coefficient of thermal expansion $\alpha_1$. The fastener has a shank of a selected cross section passing through the bore in the first member and the aperture in the second member. As embodied herein, fastener 15 which may be a bolt includes a head 18 that is integral with shank 16, the latter having a threaded end 17 on which a threaded nut 20 is threadedly engaged. The material of which fastener 15 is made has a coefficient of thermal expansion greater than the coefficient of thermal expansion of member 12. Fastener 15, including shank 16, is preferably made of metal having a coefficient of thermal expansion in the range of about $4\times10^{-6}$ to $13\times10^{-6}$ in./in./°F. Fastener 15 may be, for example, a conventional metal bolt having a smooth shank 16 and a threaded end 17 on to which a threaded nut 20 is threadedly engaged. Shank 16 has a diameter, as shown by dimension line 32, that is smaller than the diameter of bore 14 as shown by dimension line 30. Shank 16 is disposed within bore 14.

According to the invention, there is further provided an annular bushing 21 disposed in the bore 14. Bushing 21 has an external circumferential surface 34 closely engaged by bore 14, an internal circumferential surface 36 closely surrounding shank 16 and a frangible portion 28 extending between said external and internal circumferential surfaces 34 and 36, respectively. The bushing is comprised of a material having a third coefficient of thermal expansion $\alpha_3$ that is less than the first and second coefficients of thermal expansion. As embodied herein, an annular bushing 21 is provided between shank 16 and member 12. Bushing 21 has an external diameter substantially equal to the diameter of bore 14 shown by dimension line 30 and an internal diameter substantially equal to the diameter of shank 16 shown by dimension line 32.

According to the preferred embodiment of the invention, bushing 21 is made of a material having a coefficient of thermal expansion substantially equal to zero. Bushing 21 may be comprised of a carbon matrix with carbon fibers formulated in a manner to achieve a coefficient of thermal expansion equal to zero.

According to another embodiment of the invention, bushing 21 is comprised of a material having a coefficient of thermal expansion less than zero. Such a bushing may be comprised of a carbon matrix with carbon fibers formulated to result in a negative thermal expansion material. That is, bushing 21 may be formulated to contract as the temperature of the bushing increases.

The frangible portion 28 of bushing 21 is provided to permit bushing 21 to separate when the diameter of shank 16 increases upon thermal expansion. Frangible portion 28 may be formed as a score line 28a that breaks upon the first expansion of shank 16, or may be formed as a gap 28b which is cut completely through bushing 21. More than one frangible portion 28 may be used, and multiple frangible portions may be arranged equally spaced around the circumference of bushing 21.

According to the invention the cross-sectional dimensions of the shank and bore have the following relationship:

$$D_1/D_2=(\alpha_3-\alpha_1)/(\alpha_3-\alpha_2) \quad (1)$$

where
- $D_1$ = shank cross sectional dimension
- $D_2$ = bore dimension
- $\alpha_1$ = first member coefficient of thermal expansion
- $\alpha_2$ = shank coefficient of thermal expansion
- $\alpha_3$ = bushing coefficient of thermal expansion According to the preferred embodiment, the shank and bore are circularly cylindrical and the shank and bore dimensions $D_1$ and $D_2$ are the diameters of the shank and bore, respectively. The ratio of the diameter of shank 16 as shown by dimension line 32 to the diameter of bore 14 as shown by dimension line 30 equals the ratio of the difference between the coefficient of thermal expansion of the bushing and the coefficient of thermal expansion of the first member to the difference between the coefficient of thermal expansion of the bushing and the coefficient of thermal expansion of the shank. It can be seen in FIG. 2 that the diameter of bore 14 in member 12 as shown by dimension line 30 is substantially equal to the outer diameter of bushing 21.

According to another preferred embodiment of the invention, the bushing coefficient of thermal expansion $\alpha_3$ is approximately equal to zero. In this case the relationship between dimensions $D_1$ and $D_2$ is as follows:

$$D_1/D_2=\alpha_1/\alpha_2. \quad (2)$$

By selecting the dimensions of the fastener, bushing and bore according to either of these equations, (1) or (2), shank 16 will fit closely within bore 14 of member 12 both before and after thermal expansion or contraction of shank 16. In addition, the joint assembly 10 will not experience thermal stress because bushing 21 will separate or converge at frangible portion 28 so that the fit between shank 16 and member 12 remains close without an increase in stress on either member 12 or shank 16.

Washers 22 and 24 may be made from a material having a coefficient of thermal expansion greater than that of fastener 15 so that as shank 16 elongates with increased temperature, washers 22 and 24 increase in thickness to maintain bolt preload by bearing against head 18 and nut 20.

It will be apparent to those skilled in the art that modifications and variations can be made in the joint assembly of this invention. The invention in its broader aspects is, therefore, not limited to the specific details, representative methods and apparatus, and illustrative examples shown and described herein and above. Thus, it is intended that all matter contained in the foregoing description or shown in the accompanying drawings shall be interpreted as illustrative and not in a limiting sense.

What is claimed:

1. A thermal stress-free joint assembly for joining a high thermal expansion material and a low thermal expansion material, the joint assembly comprising:

a first member having a bore therethrough, said first member comprised of a first material having a first coefficient of thermal expansion, said bore having a selected cross section;

a second member;

a fastener comprised of a second material having a second coefficient of thermal expansion, said second coefficient of thermal expansion being greater than said first coefficient of thermal expansion, said fastener having a shank of a selected cross section passing through said bore, said fastener engaging said second member for joining said first member with said second member;

an annular bushing disposed in said bore and having a selected external diameter and an external circumferential surface closely engaging the periphery of said bore, an internal circumferential surface closely engaging said shank and at least one frangible portion extending between said external and internal circumferential surfaces, said bushing being comprised of a rigid material having a third coefficient of thermal expansion that is less than said first and second coefficients of thermal expansion such that said bushing and said shank remain close-fitting over a wide range of temperatures to provide a connection that will not allow relative movement of the parts of the assembly; and said shank and bushing dimensions being selected in accordance with the following equation:

$$D_1/D_2 = (\alpha_3 - \alpha_1)/(\alpha_3 - \alpha_2)$$

where
$D_1$ = shank cross sectional dimension
$D_2$ = bore dimension
$\alpha_1$ = first member coefficient of thermal expansion
$\alpha_2$ = shank coefficient of thermal expansion
$\alpha_3$ = bushing coefficient of thermal expansion.

2. The joint of claim 1 wherein said fastener is a metallic bolt having a circular cross-sectional area, the coefficient of expansion of said metallic bolt being in the range of about $4 \times 10^{-6}$ to about $13 \times 10^{-6}$ in./in./°F.

3. The joint of claim 2 wherein the first member is comprised of a ceramic material having a coefficient of thermal expansion in the range of about $1 \times 10^{-6}$ to about $2 \times 10^{-6}$ in./in./°F. and said bore has circular cross-sectional area.

4. The joint of claim 3, wherein the bushing has an annular cross section and said frangible portion constitutes a score line.

5. The joint of claim 3, wherein said bushing has an annular cross section and said frangible portion constitutes a gap.

6. The joint of claim 5, wherein the bore and the shank are both cylindrical.

7. The joint of claim 3, wherein the bushing is comprised of a material having a coefficient of thermal expansion substantially equal to zero.

8. The joint of claim 7, wherein the bushing material is a carbon matrix with carbon fibers.

9. The joint of claim 3, wherein the bushing material has a coefficient of thermal expansion less than zero.

10. The joint of claim 9 wherein the bushing material is a carbon matrix with carbon fibers.

* * * * *